Patented Nov. 26, 1935

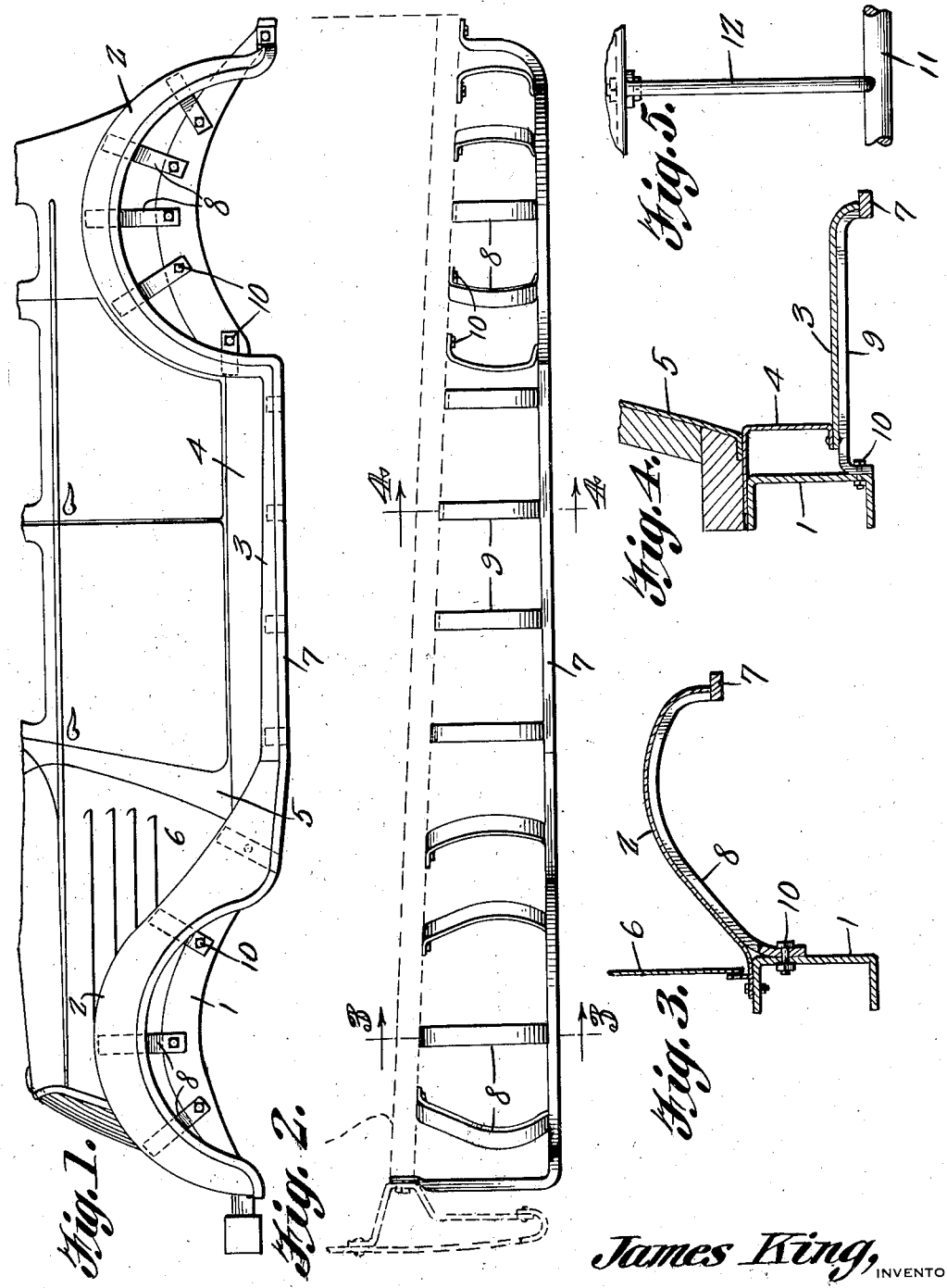

2,022,421

UNITED STATES PATENT OFFICE 2,022,421

AUTOMOBILE BODY PROTECTOR

James King, St. Albans, N. Y.

Application November 19, 1934, Serial No. 753,712

1 Claim. (Cl. 280—152)

The object of this invention is to provide a light inexpensive frame which may be readily secured in place and will effectually reenforce the fenders and running board of an automobile and resist breaking of the same from collision or vibration. The invention is illustrated in the accompanying drawing and consists in certain novel features hereinafter first fully described and then more particularly defined in the appended claim.

In the drawing:

Figure 1 is a side elevation of a portion of an automobile having the invention applied thereto.

Figure 2 is a plan view of the protector, the adjacent portions of the automobile being indicated by dotted lines.

Figure 3 is a section on the line 3—3 of Figure 2, on a larger scale.

Figure 4 is a section on the line 4—4 of Figure 2, on a larger scale.

Figure 5 is a detail showing a modification.

Referring to the drawing in detail, the numeral 1 designates the chassis sills, 2 the fenders, 3 the running board, 4 the skirt, 5 the body and 6 the hood of an automobile, all of known or any approved design.

In carrying out the present invention, there is provided a frame 7 consisting of a metal bar shaped to conform to the outer edges of the fenders and the running board, as clearly shown in Figure 1, and having its end portions 8 bent laterally and bolted or riveted to the ends of the sills 1. As shown in Figures 3 and 4, the frame is preferably a flat bar disposed under the edges of the automobile parts with its own edge projecting out from the parts to receive the blow and shock of a collision and thereby protect the running board and fenders. A plurality of cross bars 8, 9 are secured at their outer ends to the frame bar 7 at intervals in the length thereof, the bars 9 being straight with downturned ends to fit against the bottom of the running board and the bars 8 being of a general arch form to fit against and conform closely to the under sides of the fenders. The outer ends of the cross bars are intimately united with the main frame bar, preferably by welding, and their inner ends are firmly bolted to the sills, as shown at 10. It will also be noted, upon reference to Figure 2, that the cross bars gradually diminish in length from front to rear of the automobile to accommodate the lines of the model.

While the frame will generally be formed of flat bars, as shown in Figures 1 to 4, it may otherwise be made and in Figure 5 I have shown a main bar 11 and cross bar 12 of circular cross section. When this form is used, the main frame bar will be so disposed as to project somewhat beyond the edges of the fenders and running board.

The frame of this invention very effectually reenforces and supports the fenders and running board so that they are not apt to break loose and sag from vibration and will successfully withstand collisions.

Having described my invention, what I claim is:

A reenforcing and protecting frame for automobiles comprising a main bar including an intermediate straight portion and end arcuately curved portions each bent to provide right-angularly disposed portions having the ends thereof secured to the chassis frame of an automobile adjacent the front and rear ends of the latter, said straight portion contacting an under face of a running board of the automobile and projecting beyond the outer edge of said running board, said arcuately curved portions engaging under faces of fenders of the automobile and projecting outwardly of the outer edges of said fenders, and a plurality of spaced strips secured at one end to the main bar and the other ends secured to the chassis frame and underlying and contacting the fenders and the running board.

JAMES KING.